United States Patent
Dwarakanath et al.

(10) Patent No.: US 9,692,755 B2
(45) Date of Patent: Jun. 27, 2017

(54) ELECTRONIC DATA TRANSFER BETWEEN TRUST CONTACTS

(71) Applicant: Intel Corporation, Santa Clara, CA (US)

(72) Inventors: Kumar N Dwarakanath, Folsom, CA (US); Benjamin Niewenhuis, Battle Creek, MI (US); Uttam K Sengupta, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/752,678

(22) Filed: Jun. 26, 2015

(65) Prior Publication Data

US 2016/0381727 A1    Dec. 29, 2016

(51) Int. Cl.
*H04B 5/00* (2006.01)
*H04L 29/06* (2006.01)
(Continued)

(52) U.S. Cl.
CPC .......... *H04L 63/0861* (2013.01); *H04W 8/005* (2013.01); *H04W 12/06* (2013.01)

(58) Field of Classification Search
CPC .. H04W 76/023; H04W 12/06; H04L 63/0861
See application file for complete search history.

(56) References Cited

U.S. PATENT DOCUMENTS

| 2007/0274270 A1 | 11/2007 | Jones et al. |
| 2013/0210354 A1* | 8/2013 | Kang .................. H04B 5/0031 455/41.1 |

(Continued)

FOREIGN PATENT DOCUMENTS

| KR | WO 2015072783 | * 5/2015 | ............ G06F 12/14 |
| WO | 2015-072783 A1 | 5/2015 | |
| WO | 2015-094220 A1 | 6/2015 | |

OTHER PUBLICATIONS

IEEE Std. 802.11-2012, IEEE Standard for Information technology—Telecommunications and information exchange between systems Local and metropolitan networks—Specific requirements, Part 11: Wireless LAN Medium Access Control (MAC) and Physical Layer (PHY) Specifications, IEEE Computer Society, Mar. 29, 2012, 2793 pages.

(Continued)

*Primary Examiner* — Xin Jia
(74) *Attorney, Agent, or Firm* — Grossman, Tucker, Perreault & Pfleger, PLCC (57) ABSTRACT

Mobile devices can be wirelessly linked to an increasing number of wearable devices. Sensors included in both mobile and wearable devices possessed by a first party and a second party can detect physical, biometric, or environmental inputs. A logic circuit in each of the portable electronic devices can autonomously determine whether these inputs are indicative of a trusted contact between the first and the second parties in various social, business, and commercial settings based at least in part on local social, business, and interpersonal practices and norms. A first portable electronic device possessed by a first party and a second portable electronic device possessed by a second party may autonomously exchange public or private information based on detecting a trusted contact between the first party and the second party. Such devices may also track ongoing trusted contact between the first party and the second party in social, business, and commercial settings.

19 Claims, 7 Drawing Sheets

(51) Int. Cl.
*H04W 12/06* (2009.01)
*H04W 8/00* (2009.01)

(56) References Cited

U.S. PATENT DOCUMENTS

| | | |
|---|---|---|
| 2014/0019304 A1 | 1/2014 | Lee et al. |
| 2014/0096180 A1* | 4/2014 | Negi .................. H04L 63/0492 726/1 |
| 2014/0149859 A1 | 5/2014 | Van Dyken et al. |
| 2016/0041593 A1* | 2/2016 | Dharawat ............. G06F 1/3215 713/323 |

OTHER PUBLICATIONS

Standard ECMA-340, Near Field Communication—Interface and Protocol (NFCIP-1), 3rd Edition, ECMA International, Jun. 2013, 52 pages.
Standard ECMA-352, Near Field Communication Interface and Protocol-2 (NFCIP-2), 3rd Edition, ECMA International, Jun. 2013, 12 pages.
IEEE Std. 802.15.3c-2009, IEEE Standard for Information technology—Telecommunications and information exchange between systems—Local and metropolitan area networks—Specific requirements, Part 15.3: Wireless Medium Access Control (MAC) and Physical Layer (PHY) Specifications for High Rate Wireless Personal Area Networks (WPANs), Amendment 2: Millimeter-wave-based Alternative Physical Layer Extension, IEEE Computer Society, Oct. 12, 2009, 203 pages.
Bluetooth Core Specification 4.2 Quick Reference Guide, Bluetooth SIG, Dec. 2014, 2 pages.
International Search Report and Written Opinion issued in PCT Application No. PCT/US2016/034710, dated Aug. 18, 2016.

* cited by examiner

FIG. 9

ELECTRONIC DATA TRANSFER BETWEEN TRUST CONTACTS

TECHNICAL FIELD

The present disclosure relates to data transfers between portable electronic devices.

BACKGROUND

Face-to-face or in-person meetings often result in improved relationships and increased trust between parties. Such improvement in relationships or increase in trust is particularly evident when such meetings occur within a professional or social setting where the parties will meet and remain in relatively close proximity for an extended time (e.g., the duration of a business meeting or formal dinner). This increase in trust is not reflected in the digital domain unless the parties make a conscious effort and follow specific information exchange protocols. For example, users of Android® portable devices must take the affirmative action of tapping devices to enable an exchange of information between devices. Prior to the ubiquity of portable electronic devices, parties would exchange information in printed format, for example by exchanging business cards.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

With the increasing number of wearable devices such as the Fitbit® Activity Tracker, the Pebble® smart watch, Android® wear, the Apple Watch®, Google® Glass® and the Samsung Gear S®, sensors collect a variety of biometric and environmental information about our daily activities and interactions with others. In addition, many portable electronic devices include accelerometers, gyroscopes, magnetometer, ambient light sensors, microphones, cameras and other similar sensors useful for collecting both biometric and environmental information. Using biometric or environmental information obtained from such sensors it is possible to detect when trusted contact occurs between two or more parties. Based on the detected trusted contact, a portable device carried by each party in trusted contact may communicate information to one or more other portable electronic devices carried by a party identified as a trusted contact. Such information may include personal information (e.g., an electronic business card) and may include information such as personal or public cryptographic key material to facilitate autonomous secure or trusted communication between the two parties.

Evidence of a trusted contact between parties may be determined in a number of ways based upon the cultural preferences, behaviors, practices, mores, and norms of a society. In some cultures, hand gestures such as a handshake between parties may indicate a trusted relationship between the parties. In such instances, sensors such as accelerometers disposed in a wearable device such as a watch or bracelet can detect motion or displacement of a wearer's hand indicative of a handshake. In other cultures, body positioning such as a hug or a kiss on the cheek between parties may indicate a trusted relationship between the parties. In such instances, sensors such as cameras or proximity sensors disposed either in wearable devices or within the portable electronic device itself can detect motion or positioning indicative of a hug or a kiss on the cheek between the parties. The use of wearable sensors (bands, buttons, broaches, lockets, etc.) along with specific context information (physical aspects, biometric aspects, and environmental aspects) provide inputs that assist the portable electronic device in making the autonomous determination that the party possessing the device is in a trusted contact or trusted relationship situation with a second party.

At times, actual physical contact between the parties may not represent a prerequisite to detecting a trusted relationship between parties. For example, proximity detected using global positioning or similar geolocation when augmented with other information such as calendar entries, voice recognition, and the like may be used to infer a trusted relationship within a business or commercial setting. At times, inputs such as proximity, location, calendar entries, voice recognition, and the like may be used to further increase the confidence in the detected trusted relationship.

In embodiments, a portable electronic device suitable for detecting a trusted contact between a first party and a second party and exchanging information with a second portable electronic device carried by the second party can include at least one sensor that provides a signal containing data indicative of one or more physical, biometric, or environmental parameters indicative of a trusted contact between the first party and the second party. In some embodiments, the sensor can be disposed in a wearable device worn by the first party. The portable electronic device further includes a wireless interface for communicating with the second portable electronic device. The portable electronic device further includes a logic circuit such as a processor, controller, or microprocessor that executes a machine readable instruction set. The machine readable instruction set may cause the portable electronic device to receive from the at least one sensor at least one signal that includes data. The instructions may further cause the portable electronic device to autonomously determine whether the data included in the sensor signal is indicative of a trusted contact between a first party possessing the first portable device and a second party possessing a second portable device. The instructions may further cause the portable electronic device to autonomously initiate a wireless pairing with a processor in the second portable device responsive to the determination that a trusted contact between the first party and the second party has occurred. The machine readable instruction set may further cause the portable electronic device to autonomously determine whether a prior trusted contact between the first party and the second party has occurred. The machine readable instruction set may further generate a first message that includes data logically associated with the first party. The machine readable instruction set may further cause the portable electronic device to autonomously communicate, via the at least one wireless communication interface, the first message to the second portable device processor.

A method of communicating information between a first portable device possessed by a first party and a second portable device possessed by a second party may include receiving by a processor in the portable device a signal including data from a communicably coupled sensor. The method may further include determining by the processor whether data included in the signal is indicative of a trusted contact between the first party and the second party. The method may additionally include autonomously initiating, by at least the first portable device processor, a pairing with a processor in the second portable device responsive to determining a trusted contact between the first party and the second party has occurred. The method may include autonomously determining, by the first portable device processor whether a prior trusted contact between the first party and the second party has occurred. The method may further include generating, by the first portable device processor, a first message that includes at least data logically associated with the first party. The method may additionally include autonomously communicating the first message to the second portable device processor via at least one wireless communication interface communicably coupled to the first portable device processor.

Figure 1:
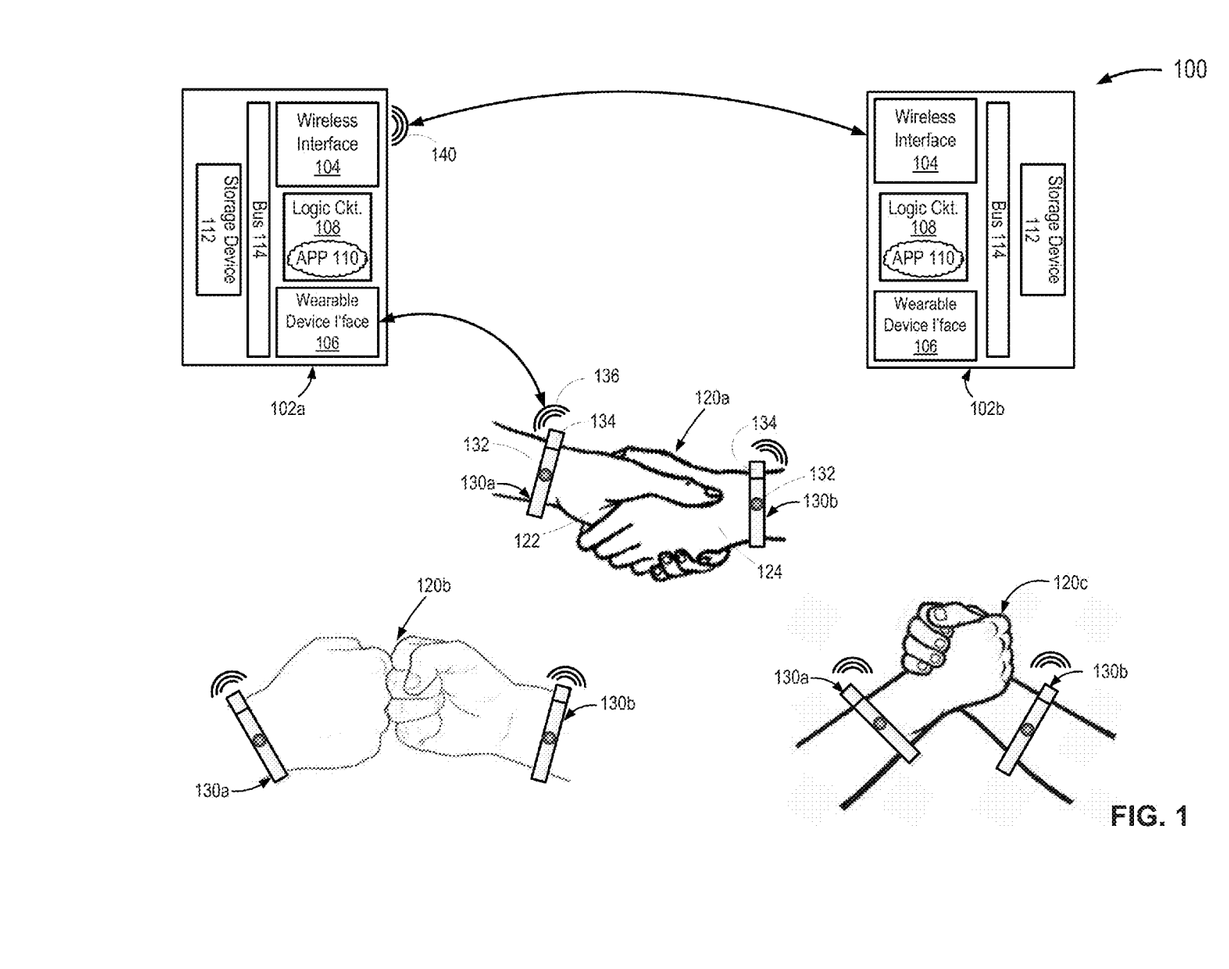
FIG. 1 illustrates an example system for exchanging information between portable devices based on sensor input indicative of hand contact between the parties indicative of a trusted relationship between the parties in accordance with at least one embodiment of the present disclosure.

FIG. 1 illustrates an example system 100 in which a first portable electronic device 102a exchanges data 142 with a second portable electronic device 102b in response to detecting trusted contact 120a in the form of a handshake between a first party 122 carrying the first portable electronic device 102a and a second party 124 carrying the second portable electronic device 102b, in accordance with one or more aspects of the present disclosure. As depicted in FIG. 1, a wearable device 130a worn by the first party 122 and a wearable device 130b worn by the second party 124 are used to detect physical movement, biometric parameters, or environmental parameters indicative of the trusted contact 120a between the first party 122 and the second party 124. Each of the wearable devices 130a and 130b (collectively, "wearable devices 130") includes at least one sensor 132 and at least one communications interface 134 used to communicate with the portable electronic devices 102a and 102b (collectively "portable electronic devices 102"). At times, as depicted in FIG. 1, the sensor 132 may wirelessly communicably couple 136 with the portable electronic device 102. At other times the sensor 132 may be tethered to the portable electronic device 102.

Each of the portable electronic devices 102 can include any system, device, or combination thereof capable of communicating with another portable electronic device 102 carried by the same or a different party. Non-limiting examples of portable electronic devices 102 include cellular telephones, smartphones, wearable computing devices (i.e., any wearable device having a processor or controller capable of executing an instruction set, such as Google Glass®, Samsung Gear S, or Apple Watch®), tablet computing devices, ultraportable computing devices, portable computing devices, and similar. The portable electronic device 102 may include any number of components that include, but are not limited to, a wireless interface 104, a wearable device interface 106, a logic circuit 108 capable of executing at least one instruction set such as an application or "app" 110, a storage device 112, and a communications bus 114. In embodiments, the app 110 executed by the logic circuit 108 can autonomously: monitor for nearby portable electronic devices 102; pair with detected portable electronic devices 102;

analyze signals received from sensors either onboard the portable electronic device 102 or on a wearable device 130; and, determine when a trusted contact 120 occurs between a first party 122 and a second party 124. Although shown as executed by the logic circuit 108, at times the app 110 may be executed in whole or in part by a processor or controller disposed in the wearable device 130 or by a processor in another electronic device carried by the party possessing the portable electronic device 102.

The wireless interface 104 communicably couples the first portable electronic device 102a carried by a first party 122 with a second portable electronic device 102b carried by a second party 124. The wireless interface 104 can include any number of wireless transmitters, wireless receivers, wireless transceivers, or combinations thereof. For example, where the portable electronic device 102 is a smartphone, the wireless interface 104 may include a CDMA, GSM, EDGE, 3G, 3GPP, 4G or LTE compatible transceiver interface capable of communicating on one or more frequency bands with the second portable electronic device 102b. At times, the wireless interface 104 can include, but is not limited to, one or more local area network (LAN) interfaces, for example a WiFi (e.g., IEEE 802.11-2012, adopted Mar. 29, 2012) compliant interface, a Near Field Communication (NFC) compliant interface (e.g., ISO/IEC 18092/ECMA-340; ISO/IEC 21481/ECMA-352), an Ultra Wideband compliant interface (e.g., IEEE 802.15.3c, published Sep. 11, 2009), or a Bluetooth® compliant interface (e.g., Bluetooth v 4.2, released Dec. 2, 2014). In some implementations, the wearable device interface 106 used to communicate with the wearable device 130 may be incorporated in whole or in part into the wireless interface 104 used to communicate with other portable electronic devices 102.

The logic circuit 108 can include one or more processors, microprocessors, controllers, digital signal processors, or programmable gate arrays capable of executing one or more instruction sets stored in whole or in part in the processor or stored in whole or in part in the storage device 112. Non-limiting example processors 108 can include, but are not limited to, Intel® Core microprocessors (Intel Inc., Santa Clara, Calif.); Intel Atom microprocessors; AMD microprocessors (Advanced Micro Devices, Inc. Sunnyvale, Calif.); Apple A8 and A8X microprocessors (Apple Inc. Palo Alto, Calif.); Qualcomm Snapdragon processors (Qualcomm Inc., San Diego, Calif.); ARM processors (ARM Holdings PLC, Cambridge, UK) and similar. In embodiments, the one or more instruction sets may include, but are not limited to, the app 110 used to detect the trusted contact 120 between a first party 122 and a second party 124 and to manage the autonomous exchange of information between the portable electronic device 102a carried by the first party 122 and the portable electronic device 102b carried by the second party 124.

The app 110 can include logic capable of detecting physical, biometric, or environmental parameters indicative of a trusted contact between at least two parties, based in whole or in part on the signals provided by the sensor 132 carried by the wearable device 130. In some instances, the app 110 receives a continuous, intermittent, periodic, or aperiodic signal from the sensor 132 and uses the data or information carried by the signal 136 to determine when one or more physical, biometric, or environmental parameters are characteristic of a trusted contact between two parties. In some instances, the app 110 may be resident in and executed at least in part by the wearable device 130 such that the wearable device 130 communicates the signal 136 to the portable electronic device 102 in an event driven manner. For example, the wearable device 130 may communicate a signal to the portable electronic device 102 only upon detecting one or more physical, biometric, or environmental parameters characteristic of a trusted contact 120 between two parties.

The app 110 autonomously pairs the portable electronic device 102a carried by a first user 122 with at least one portable electronic device 102b carried by a second user 124 upon detecting one or more physical, biometric, or environmental parameters characteristic of a trusted contact between the parties. In implementations, the app 110 may provide controls that limit or restrict the autonomous pairing of the user's portable electronic device 102 with other portable electronic devices 102. For example, the app 110 may limit the pairing of the first party's portable electronic device 102a to other portable electronic devices 102b carried by second parties associated with a particular employer, profession, title, geographic area, or similar. When implemented in the app 110, such exclusionary rules may limit the number of pairings attempted by the portable electronic device 102, for example by restricting attempted pairings to portable electronic devices 102 possessed by other parties with whom the user has identified as being of particular interest.

At times, the app 110 may permit the autonomous pairing of the portable electronic device 102a carried by a first party 122 with a portable electronic device 102b carried by each of a plurality of second parties 124. Such group pairings may occur contemporaneously, sequentially, or any combination thereof.

The app 110 may provide a user interface either on the portable electronic device 102 or on a processor-based device to which the portable electronic device 102 is coupled. The user interface may accommodate various inputs, for example a user input indicative of the physical, biometric, or environmental parameters characteristic of a trusted contact between two parties (e.g., hand shake 120a, first bump 120b, or hand clasp 120c). In some implementations, the app 110 may generate a user interface including options for autonomous sharing of public contact information, such as name, address, title, phone numbers, email information, unique device identifier associated with the respective portable electronic device, etc., with other parties after a trusted contact has been detected. In some implementations, the app 110 may generate a user interface including options for autonomous sharing of private information such as personal signature, public key, or similar cryptographic information, with other parties after a trusted contact has been detected and an autonomous pairing established between portable electronic devices. Such pairing occurs without direct interaction on the part of either party 122 or 124 and occurs based on the use preferences provided to the app 110 by each respective user. The exchange of information between portable electronic devices may not be mutual, for example the first party 122 may elect to share both personal and private information upon pairing while the second party 124 elects to share only public information.

The app 110 can use other information stored in the storage device 112 to determine whether a prior trusted contact 120 has occurred between the first party 122 and the second party 124. Such information may include an address book or similar contact list stored on the storage device 112. For example, upon detecting a nearby second portable electronic device 102b, the first portable electronic device 102a may determine whether user settings are indicative of a desire by the first party 122 to share information with the second party 124. If the first party 122 has indicated a desire to share information, the app 110 may determine whether a prior trusted contact 120 has occurred between the parties. If a prior trusted contact 120 has occurred and the information provided by the portable electronic device 102b matches the information already stored on the storage device 112 in portable electronic device 102a, the app 110 in portable electronic device 102a may increment a monotonic counter in the first portable electronic device 102a logically associated with the second party 124. Such counters may provide the first party 122 with an indication of the strength of the relationship with the respective second party 124 (i.e., a larger contact count with a second party may indicate a closer relationship with the second party than a smaller contact count).

Although the wearable devices 130 are shown as worn on the wrist, such wearable devices 130 are not limited to placement only on the wrist. For example, wearable devices 130 may include other items such as lockets, buttons, badges, eyewear, articles of clothing, accessories, jewelry and the like, some or all of which may be used to carry or house at least one sensor 132 and at least one communications interface 134. In some implementations, wearable device 130 may be self-powered in whole or in part, for example using a kinetic energy or similar recovery system in combination with an energy storage cell such that movement of the wearable device creates a charge that is stored in the storage cell. In another example, the wearable device may include one or more solar cells or similar energy producing devices coupled to one or more energy storage cells. In some implementations, the wearable device 130 may be powered in whole or in part using a battery or similar replaceable energy storage cell such as an alkaline or lithium battery. In yet other implementations, the wearable device 130 may be powered in whole or in part using a rechargeable or secondary energy storage device such as a lithium ion (Li-ion), lithium ion polymer (Li-ion polymer), nickel-metal hydride (NiMH), or nickel cadmium (NiCd) batteries. In implementations where the wearable device 130 is tethered to the portable electronic device 102, the wearable device may be powered in whole or in part by the portable electronic device 102 power supply.

The at least one sensor 132 can include any number of individual sensors or any number of multiple sensor arrays. In one example, the at least one sensor 132 can include at least three accelerometers to measure the movement or displacement of the wearable device 130 in a three-dimensional space or use a combination of accelerometer and gyroscope for the same purpose. In embodiments, each sensor 132 may include, but is not limited to, one or more devices capable of measuring one or more physical parameters such as motion, distance, velocity, acceleration, stress, strain, position or location in three-dimensional space, orientation in three dimensional space, geolocation, and similar. In embodiments, each sensor 132 may include, but is not limited to, one or more devices capable of measuring one or more biometric parameters of the party possessing the wearable device 130. Such biometric parameters may include, but are not limited to, fingerprint recognition, face recognition, voice recognition, iris recognition, palm vein, hand geometry, skin conductivity, skin temperature, blood pressure, pulse rate, respiration rate, and similar. In embodiments, each sensor 132 may include, but is not limited to one or more devices capable of measuring one more environmental parameters such as temperature, pressure, proximity, and similar. At times, any number or combination of physical, biometric, and environmental devices may provide some or all of the at least one sensor 132.

The communications interface 134 can include one or more tethered or wireless interfaces capable of communicating data received from the at least one sensor 132. In implementations, the communications interface 134 can unidirectionally or bidirectionally communicate with the portable electronic device 102. At times, such communications may use a standard communications protocol such as Bluetooth®, NFC, Zigbee (IEEE 802.15.4e, 2012), Ultra Wideband, or similar. The communication interface 134 can transmit a signal 136 continuously, intermittently, periodically, or on demand to the portable electronic device 130 with which the respective wearable device 130 is paired. Although the wearable device 130 is depicted as a dedicated device in FIG. 1, the wearable device 130 can include any device containing sensors capable of detecting one or more physical, behavioral, or environmental parameters indicative of a trusted contact between parties. Thus, for example, the accelerometer and magnetometer found in a Pebble® smartwatch may be used to detect physical or behavioral parameters indicative of a trusted contact 120 between parties 122 and 124.

Figure 2:
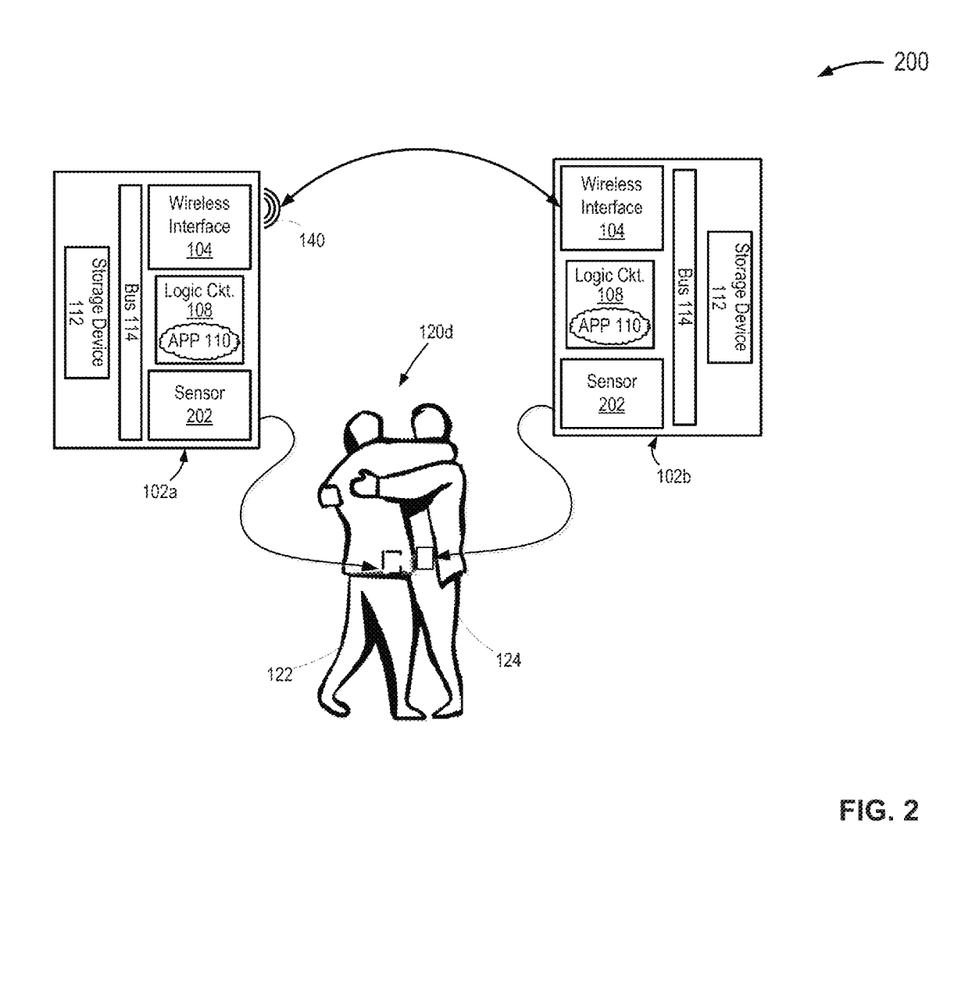
FIG. 2 illustrates an example system for exchanging information between portable devices based on sensor input indicative of bodily contact between the parties indicative of a trusted relationship between the parties, in accordance with at least one embodiment of the present disclosure.

FIG. 2 depicts another example system 200 in which one or more sensors 202 in the first portable electronic device 102a and one or more sensors 202 in the second portable electronic device 102b are used to detect one or more physical, biometric, or environmental parameters indicative of a trusted contact 120d between the first party 122 and the second party 124, in accordance with one or more aspects of the present disclosure. Such sensors 202 may be disposed internal to or be externally coupled to the portable electronic device 102. Such sensors 202 may be capable of detecting one or more physical, biometric, or environmental parameters indicative of a trusted contact 120d between the first party 122 and the second party 124 when placed in an active standby mode and placed in a pocket or holster carried by the first party 122 or the second party 124.

The at least one sensor 202 can include any number of individual sensors or any number of multiple sensor arrays. In an embodiment, the at least one sensor 202 can include at least three accelerometers to measure the movement or displacement of the portable electronic device 102 in a three-dimensional space. In embodiments, each sensor 202 may include, but is not limited to, one or more devices capable of measuring one or more physical parameters such as motion, distance, velocity, acceleration, stress, strain, position or location in three-dimensional space, orientation in three dimensional space, geolocation, and similar. In embodiments, each sensor 202 may include, but is not limited to, one or more devices capable of measuring one or more biometric parameters of the party possessing the portable electronic device 102. Such biometric parameters may include, but are not limited to, fingerprint recognition, face recognition, voice recognition, iris recognition, palm vein, hand geometry, skin conductivity, skin temperature, blood pressure, pulse rate, respiration rate, and similar. In embodiments, each sensor 202 may include, but is not limited to one or more devices capable of measuring one more environmental parameters such as temperature, pressure, proximity, and similar. At times, any number or combination of physical, biometric, and environmental devices may provide some or all of the at least one sensor 202.

Figure 3:
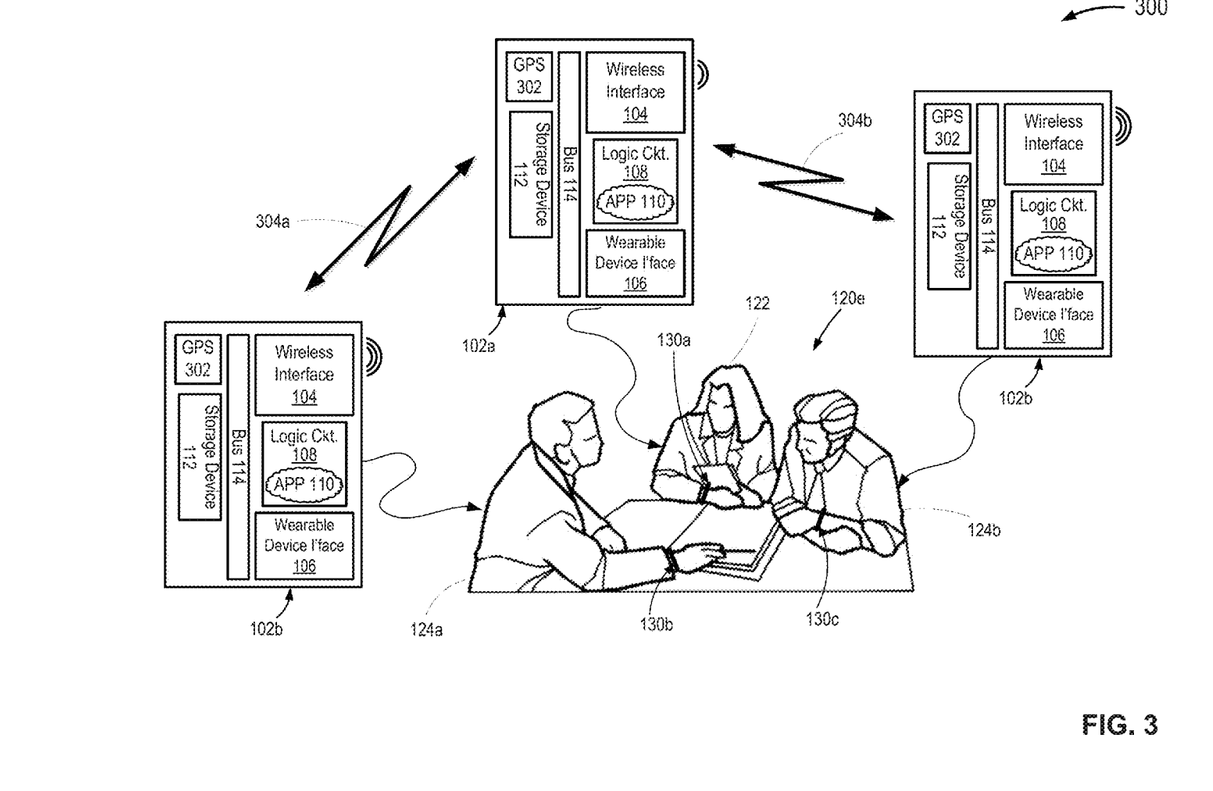
FIG. 3 illustrates an example system for exchanging information between portable devices based on sensor input indicative of one or more shared environmental conditions between the parties indicative of a trusted relationship between the parties, in accordance with at least one embodiment of the present disclosure.

FIG. 3 depicts another example system 300 in which sensors 132 in the wearable device 130a and a global positioning or similar sensor 302 in the first portable electronic device 102a possessed by a first party 122 are used to detect one or more physical, biometric, or environmental parameters indicative of a trusted contact 120e between the first party 122 and each of a plurality of second parties 124a and 124b, in accordance with one or more aspects of the present disclosure. In embodiments, the first portable electronic device 102a will attempt to autonomously pair with each of the second portable electronic devices 102b based upon the proximity of the first party 122 to each of the second parties 124.

By way of illustrative example, a calendar on the first portable electronic device 102 includes a scheduled meeting between the first party 122 and second parties 124a and 124b. At the designated time, the parties gather in a meeting room where the trusted contact 120e (i.e., the scheduled meeting) occurs. Based on the meeting data contained in the calendar of the first portable electronic device 102a, once in the meeting room (as detected by the GPS or geolocation sensor 302 in the first portable electronic device 102a), the first portable electronic device 102a may autonomously pair 304a and 304b with each of second portable electronic devices 102b. After pairing with the second portable electronic devices 102b, the first portable electronic device 102a exchanges public information, and if configured to do so, private information with each of the second portable electronic devices 102b. In embodiments, the first portable electronic device 102a may exchange the same or different information with each of the second portable electronic devices 102b based on the configuration of the first portable electronic device 102a and the configuration of each of the second portable electronic devices 102b.

In other implementations, the first portable electronic device 102a may be configured to autonomously pair with one or more second portable electronic devices 102b based on one or more inputs provided by the first party 122. For example, the first portable electronic device 102a may autonomously pair after receipt of an audio input such as a phrase spoken by the first party 122 indicative of a trusted relationship 120e between the first party 122 and the second parties 124. In some implementations, the position, location, or proximity of the first party 122 with respect to some or all of the second parties 124 may be used by the app 110 to determine whether a trusted contact 120e has occurred. For example, in a casual setting a trusted contact 120e may occur when the first party 122 is within 1 meter of the second party 124 and the first party 122 vocalizes a defined greeting appropriate for a casual setting (e.g., "What's up?"). In another example, in a business setting a trusted contact 120e may occur when the first party 122 is within 3 meters of the second party 124 and the first party 122 vocalizes a defined greeting appropriate for a business setting (e.g., "Very nice to meet you.").

The app 110 can detect a trusted contact 120 using any number of inputs received from sensors 132 disposed on or about the wearable device 130, any number of inputs received from sensors 202, 302 disposed in, on, or about the first portable electronic device 102a, or any combination thereof. The use and coordination of such a wide number of sensors 132, 202, and 302 provides fairly sophisticated capabilities in which physical actions, spoken words, locations, calendars, and other information is used by the app 110 is synthesized to distinguish a trusted contact (in which information is exchanged) from a casual meeting or casual contact (in which information is not exchanged).

Figure 4:
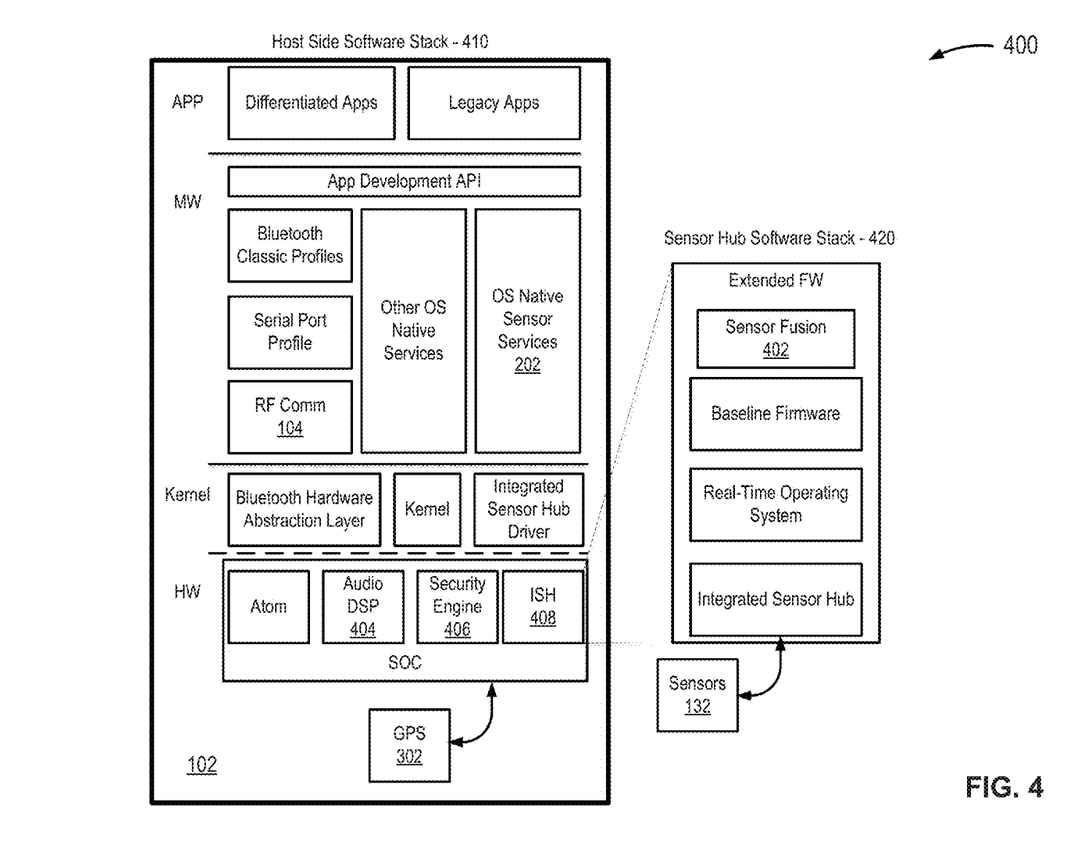
FIG. 4 illustrates an example portable device useful for exchanging information with another portable device based on sensor input indicative of a trusted relationship between the parties possessing the devices, in accordance with at least one embodiment of the present disclosure.

FIG. 4 depicts a block diagram 400 of an illustrative portable electronic device 102 showing the host side software stack 410 and the sensor hub software stack 420, in accordance with one or more aspects of the present disclosure. Various host side and sensor hub side components may provide inputs to the app 110. The data provided by the sensors 132 carried by the wearable device 130 may be used by the app 110 to determine an occurrence of a trusted contact 120 between the first party 122 and one or more second parties 124 and to autonomously pair to the second portable electronic devices 102b upon detecting a trusted contact 120.

As depicted in FIG. 4, the sensors 132 carried by the wearable device 130 communicate with the integrated sensor hub 408. Based on the data received from the sensors 132, the sensor fusion 402 determines or infers the posture, gesture, and movement of the first party 122 possessing the first portable electronic device 102a. In addition, in some embodiments, one or more sensors carried by the first portable electronic device 102a, such as a GPS or similar geolocation sensor 302 may be used to determine the location of the first party 122 and the proximity of second parties 124. In another example, a microphone carried by the first portable electronic device 102a may be used to capture voices and ambient "noise" and the audio digital signal processing circuit 404 may use such data to determine the location of the first party 122. The app 110 uses such posture, gesture, movement, location, and audio data in making the determination that a trusted contact 120 has occurred.

Responsive to the determination that a trusted contact has occurred, in some embodiments, the security engine 406 may communicate private information such as encryption keys, digital signatures, or digital certificates to one or more second portable electronic devices 120b with which the first portable electronic device 102a has paired.

Figure 5:
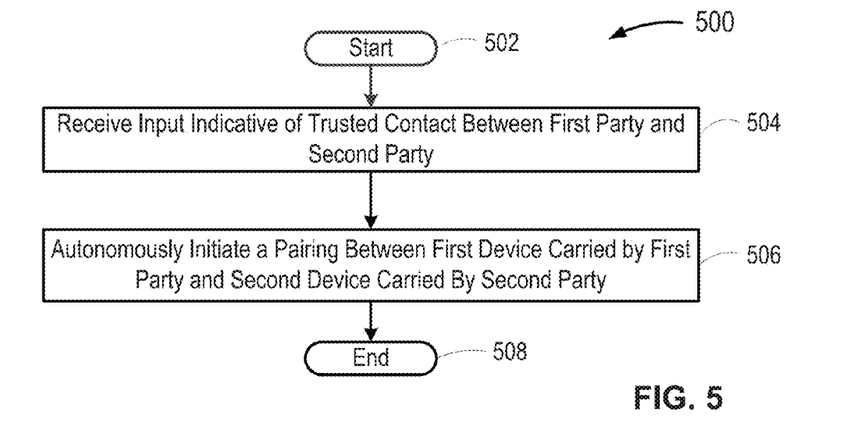
FIG. 5 illustrates an example method of exchanging information between portable devices based on sensor input indicative of trusted contact between the parties, in accordance with at least one embodiment of the present disclosure.

FIG. 5 depicts a high-level logic flow diagram of an example method 500 of autonomously pairing a first portable electronic device 102a to a second portable electronic device 102b based on detecting a trusted contact between a first party 122 possessing the first portable electronic device 102a and a second party 124 possessing the second portable electronic device, in accordance with one or more aspects of the present disclosure. The method 500 commences at 502.

At 504, the first portable electronic device 102a receives input indicative of a trusted contact 120 between a first party 122 possessing the first portable electronic device 102a and a second party 124 possessing a second portable electronic device 102b. Such trusted contact 120 may be determined based at least in part on one or more physical parameters associated with the first party 122 or second party 124; one or more biometric parameters associated with the first party 122 or second party 124; one or more environmental parameters; or any combination thereof. An app 110 executed in whole or in part on the first portable electronic device 102a uses information provided by one or more sensors 132 disposed on the wearable device 130 worn by the first party 122, one or more sensors 202, 302 carried by the first portable electronic device 102a, or any combination thereof to detect the trusted contact 120 between the parties.

At 506, responsive to detecting the trusted contact 120 between the first party 122 and the second party 124, the first portable electronic device 102a autonomously pairs with the second portable electronic device 102b, thereby communicably coupling the two devices. The method 500 concludes at 508.

Figure 6:
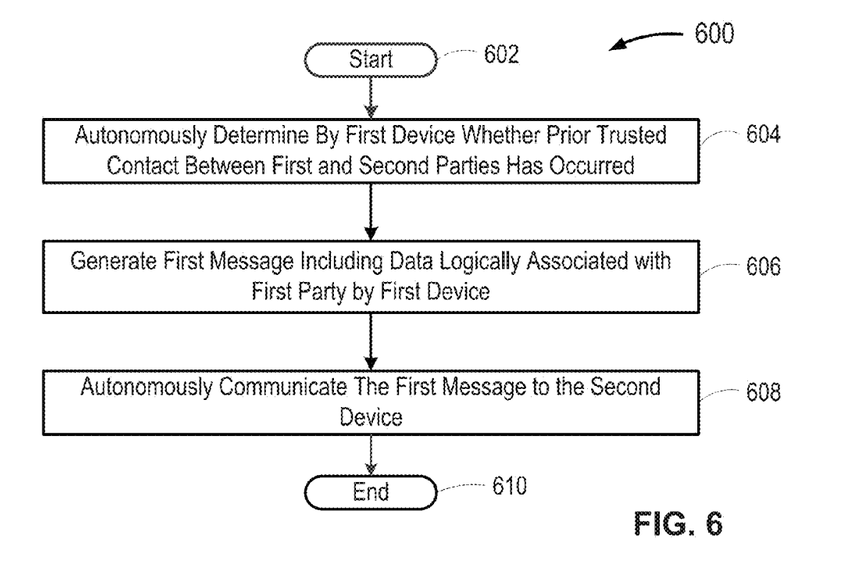
FIG. 6 illustrates an example method of autonomously communicating a message from a first portable device to a second portable device after trusted contact between parties is detected, in accordance with at least one embodiment of the present disclosure.

FIG. 6 depicts a high-level logic flow diagram of an example method 600 of autonomously determining whether a prior trusted contact 120 has occurred between the first party 122 and the second party 124 and autonomously generating a message for transmission from the first portable electronic device 102a to the second portable electronic device 102b, in accordance with one or more aspects of the present disclosure. Upon successful pairing of the first portable electronic device 102a with the second portable electronic device 102b, the devices exchange basic information that uniquely identifies the respective device 102. Using the unique identifier, the first portable electronic device 102a determines whether a prior trusted contact has occurred with the second portable electronic device 102b. Such may be accomplished, for example, using a look-up table, contact list, address book, directory or similar data storage structure retained on the storage device 112 in the first portable electronic device 102a or in a remote location that is accessible to the first portable electronic device 102a. The method 600 commences at 602.

At 604, after pairing with the second portable electronic device 102b, the first portable electronic device 102a autonomously determines whether a prior trusted contact 120 has occurred between the first party 122 and the second party 124. In embodiments, the first portable electronic device 102a compares a unique identifier received from the second portable electronic device 102b against a list of previously received unique identifiers stored either locally on the storage device 112 or in one or more locations remotely accessible by the first portable electronic device 102a.

At 606, the first portable electronic device 102a composes or otherwise autonomously generates a message that includes data logically associated with the first party 122. Such data may include public information, private information, or any combination thereof. In embodiments, the information included in the message is selected by the first party 122 via the app 110. In embodiments, the content of the message may be determined at least in part based on the number of prior trusted contacts between the first party 122 and the second party 124.

At 608, the first portable electronic device 102*a* autonomously communicates or otherwise transmits the message generated at 606 to the second portable electronic device 102*b*. The method 600 concludes at 610.

Figure 7:
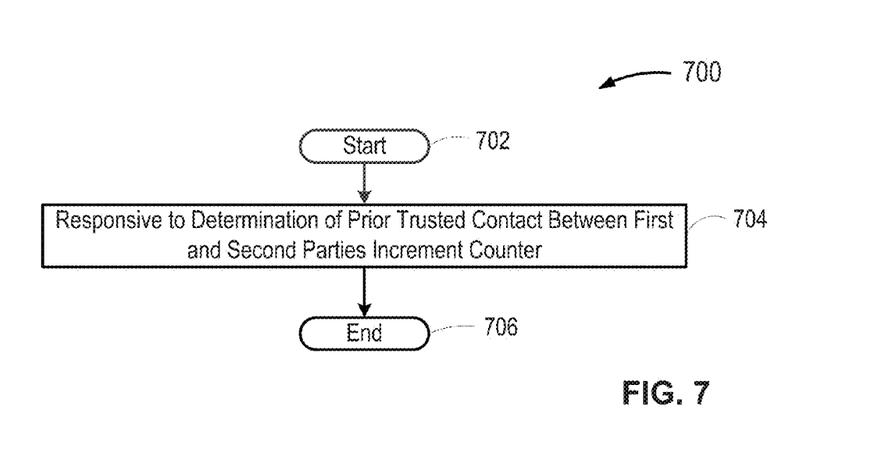
FIG. 7 illustrates an example method of autonomously communicating a message from a second portable device to a first portable device after trusted contact between parties is detected, in accordance with at least one embodiment of the present disclosure.

FIG. 7 depicts a high-level logic flow diagram of a method 700 of tracking the number of trusted contacts 120 between a first party 122 and a specific second party 124, in accordance with one or more aspects of the present disclosure. The number of trusted contacts 120 between the first party 122 and a particular second party 124 may, at times, be indicative of one or more aspects of the relationship between the first party 122 and the respective second party 124.

In some implementations, data exchanged between the first portable electronic device 102 and the second portable electronic device 152 may depend on achieving or accumulating a defined number of trusted contacts between the first party 122 and the respective second party 124. For example, upon accumulating a defined number of trusted contacts 120 (e.g., 5 trusted contacts) with a particular second party 124, the first portable electronic device 102 may autonomously communicate a message to the second portable electronic device 152 possessed by the second party 124 that inquires whether the second party 124 would like to meet for dinner at some time in the future. The method 700 commences at 702.

At 704, a monotonic counter in the first portable electronic device 102*a* may be incremented responsive to a determination that a prior trusted contact between the first party 122 and the second party 124 has occurred. In embodiments, a different monotonic counter may be logically associated with each second party 124 with whom the first party 122 has had a trusted contact 120. In embodiments, the dates and times of prior trusted contacts 120 between the first party 122 and the respective second party 124 may be stored on the storage device 112 in the first portable electronic device 102*a* or in a remote or network location accessible to the first portable electronic device 102. The monotonic counter therefore provides a measure of "acquaintedness" or "familiarity" between the first party 122 and each second party 124 with whom the first party 122 has had a trusted contact 120. The method 700 concludes at 706.

Figure 8:
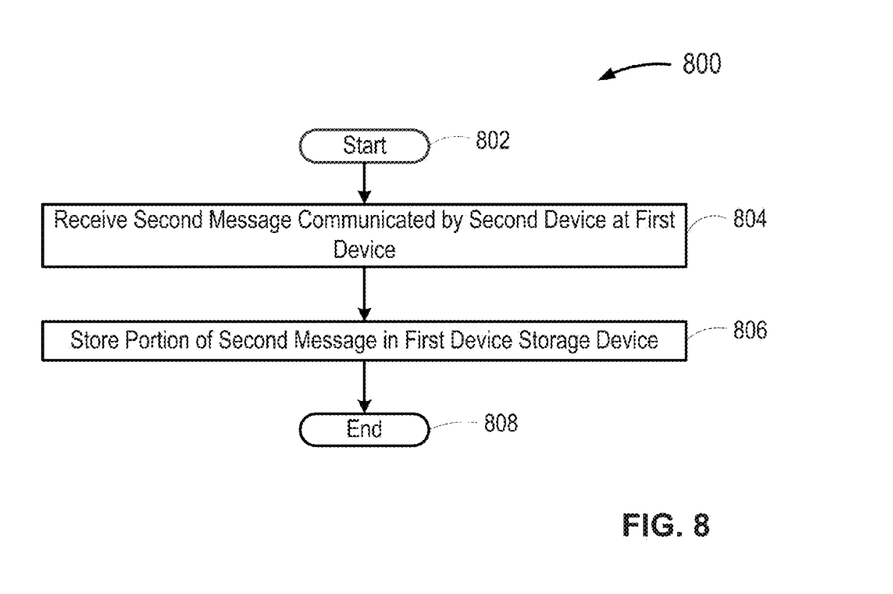
FIG. 8 illustrates an example method of storing within a portable device the information obtained from another portable device after trusted contact between parties is detected in accordance with at least one embodiment of the present disclosure.

FIG. 8 depicts a high-level logic flow diagram 800 of a method of exchanging messages between a first portable electronic device 102*a* and a second portable electronic device 102*b* such that information from the second portable electronic device 102*b* is received by the first portable electronic device 102*a*, in accordance with one or more aspects of the present disclosure. In embodiments, the first portable electronic device 102*a* and the second portable electronic device 102*b* may exchange private information in the form of public keys (asymmetric); shared secrets (symmetric); pretty good privacy (PGP) keys; or any other system or technique useful for providing or facilitating secure communications between the first party 122 and the second party 124. The method 800 commences at 802.

At 804, the first portable electronic device 102 receives a message composed by the second portable electronic device 102*b*. In embodiments, the message composed by the second portable electronic device 102*b* may include private information in the form of an encryption key or similar device or structure useful for providing secure communications between the first party 122 and the second party 124.

At 806, the first portable electronic device 102*a* stores at least a portion of the message received from the second portable electronic device 102*b*. In embodiments, the first portable electronic device 102 logically associates the stored data with an identifier unique to the second portable electronic device 102*b*, the second party 124, or both the second portable electronic device 102*b* and the second party 124. In such instances, the stored data may be used to encrypt or otherwise certify future electronic communications between the first party 122 and the second party 124. The method 800 concludes at 808.

Figure 9:
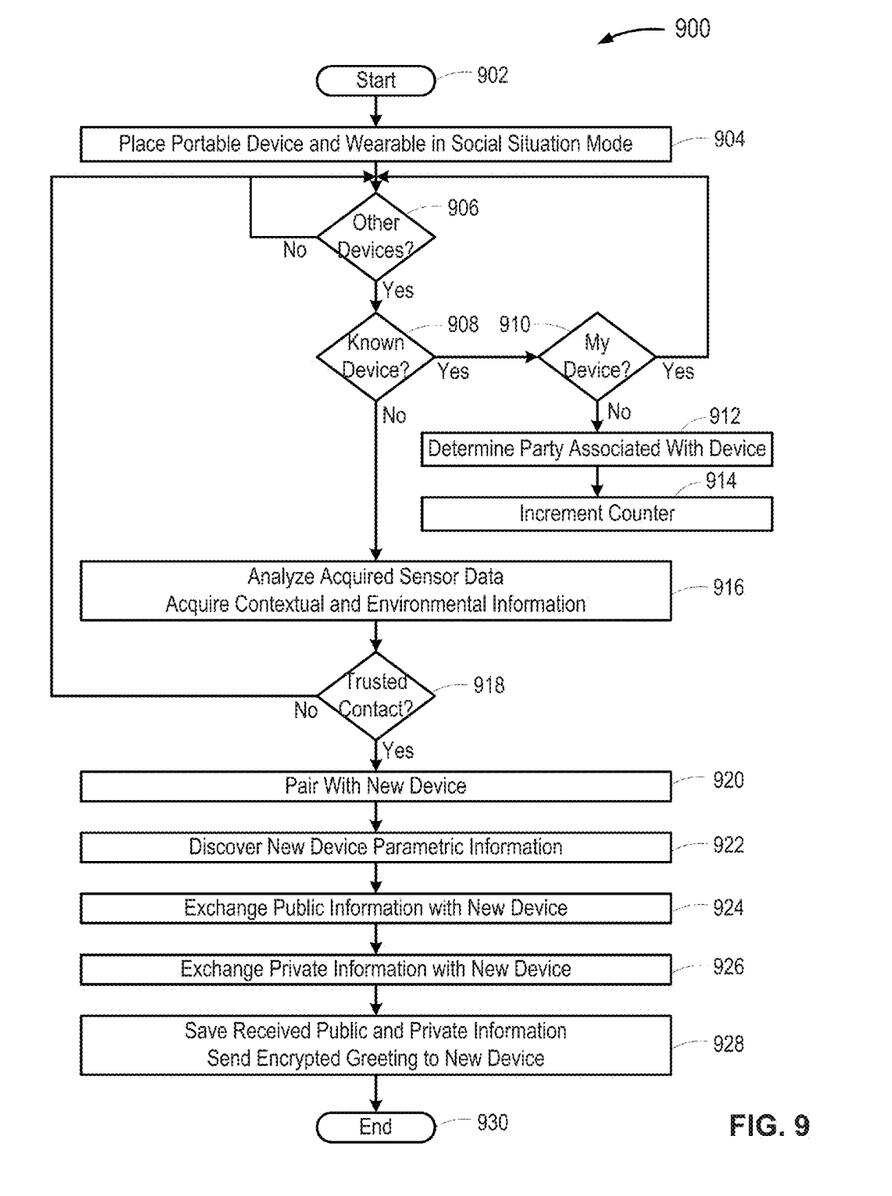
FIG. 9 illustrates an example method of exchanging information between portable devices based on sensor input indicative of trusted contact between the parties, in accordance with at least one embodiment of the present disclosure.

FIG. 9 depicts a high-level logic flow diagram of a method 900 of exchanging information between a first portable electronic device 102*a* and a second portable electronic device 102*b* after establishing a trusted contact between a first party 122 possessing the first portable electronic device 102*a* and a second party 124 possessing the second portable electronic device 102*b*, in accordance with one or more aspects of the present disclosure. The method 900 commences at 902.

At 904, the first party 122 places the first portable electronic device 102*a* in a social situation mode where the first portable electronic device 102*a* may discover other second portable electronic devices 102*b* and is discoverable by other second portable electronic devices 102*b*. In embodiments, the first party 122 places the first portable electronic device 102*a* in the social situation mode via the app 110. In embodiments, the first portable electronic device 102*a* may enter the social situation mode responsive to a particular event, occurrence, or trigger. For example, the first portable electronic device 102*a* may enter the social situation mode responsive to the first party 122 attending a meeting scheduled on the calendar of the first portable electronic device 102*a*.

At 906, the first portable electronic device 102*a* determines whether other portable electronic devices 102 are nearby. In embodiments, the first portable electronic device 102*a* can actively detect other portable electronic devices 102, for example by continuously, intermittently, periodically, or aperiodically polling for other nearby portable electronic devices 102. In embodiments, the first portable electronic device 102*a* can passively detect other portable electronic devices 102, for example by "listening" for messages broadcast by the other portable electronic devices 102.

At 908, upon detecting one or more portable electronic devices 102, the first portable electronic device 102 determines whether a trusted contact 120 has occurred between the first portable electronic device 102*a* and any of the detected portable electronic devices 102. If a prior trusted contact has occurred between the first portable electronic device 102*a* and another portable electronic device 102 the method 900 proceeds to 910. If a prior trusted contact 120 has not occurred between the first portable electronic device 102*a* and the detected portable electronic device 102, the method 900 proceeds to 916.

At 910, responsive to determining that a prior trusted contact 120 has occurred between the first portable electronic device 102*a* and a second portable electronic device 102*b*, the first portable electronic device 102*a* confirms that the detected second portable electronic device 102*b* is not a device logically associated with the first party 122. If the detected device is logically associated with the first party 122, the method 900 returns to 906. If the detected device is logically associated with a second party 124, the method 900 proceeds to 912.

At 912, the first portable electronic device 102a determines the second party 124 logically associated with the detected second portable electronic device 102b. In embodiments, the first portable electronic device 102a can look-up the identity of the second party 124 logically associated with the second portable electronic device 102b in a look-up table or data store retained on the storage device 112 in the first portable electronic device 102a or in a look-up table or data store that is remotely accessible by the first portable electronic device 102a.

At 914, after identifying the second party 124, the first portable electronic device 102a increments a monotonic counter logically associated with the second party 124.

At 916, the first portable electronic device 102a analyzes data acquired from sensors 132 carried by a wearable device 130 carried by the first party 122, sensors 202, 302 carried by the first portable electronic device 102a, or combinations thereof. Such sensors may provide physical data, biometric data, environmental data, or any combination thereof to the first portable electronic device 102a. In embodiments, the app 110 analyzes at least a portion of the data provided by the sensors 132, 202, and 302 to the first portable electronic device 102a.

At 918, using the physical, biometric, and environmental data analyzed at 916, the first portable electronic device 102a determines whether a trusted contact 120 has occurred between the first party 122 and a second party 124. If no trusted contact 120 has occurred, the method returns to 906. If trusted contact 120 has occurred between the first party 122 and the second party 124, the method 900 proceeds to 920.

At 920, responsive to detecting a trusted contact 120 between the first party 122 and the second party 124, the first portable electronic device 102a pairs with the second portable electronic device 102b.

At 922, the first portable electronic device 102a receives parametric data from the second portable electronic device 102b. Such parametric data may include one or more unique identifiers associated with the second portable electronic device 102b. Such parametric data may also include basic device information about the second portable electronic device 102b. For example, device type, device resolution, device storage capacity, current device free storage capacity, and similar. At 924, the first portable electronic device 102a exchanges public information with the second portable electronic device 102b.

At 926, the first portable electronic device 102a exchanges private information with the second portable electronic device 102b.

At 928, the first portable electronic device 102a saves at least a portion of the private information and at least a portion of the public information received from the second portable electronic device 102b. In embodiments, the first portable electronic device 102a composes and transmits a greeting message to the second portable electronic device 102b responsive to storing the public and private information logically associated with the second portable electronic device 102b. In embodiments, the message transmitted by the first portable electronic device 102a may be encrypted using private information received from the second portable electronic device 102b. The method 900 concludes at 930.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for binding a trusted input session to a trusted output session to prevent the reuse of encrypted data obtained from prior trusted output sessions.

According to example 1 there is provided a system of exchanging information between devices responsive to autonomously detecting a trusted contact between the parties possessing the devices. The system may include at least one sensor, at least one wireless communications interface; and, at least one logic circuit communicably coupled to the at least one sensor and to the at least one wireless communication interface. The at least one logic circuit may receive from the at least one sensor at least one signal that includes data. The at least one logic circuit may also autonomously determine whether the data included in the sensor signal is indicative of a trusted contact between a first party possessing the first portable device and a second party possessing a second portable device. The at least one logic circuit may also autonomously initiate a wireless pairing with a logic circuit in the second portable device responsive to the determination that a trusted contact between the first party and the second party has occurred.

Example 2 may include the elements of example 1 and the at least one logic circuit may autonomously determine whether a prior trusted contact between the first party and the second party has occurred. The at least one logic circuit may generate a first message that includes data logically associated with the first party. The at least one logic circuit may autonomously communicate, via the at least one wireless communication interface, the first message to the second portable device logic circuit.

Example 3 may include the elements of any of examples 1 or 2 and the at least one logic circuit may further generate the first message that includes data logically associated with the first party, the first message including at least one of: data representative of public information logically associated with the first party; or data representative of private information logically associated with the first party.

Example 4 may include the elements of any of examples 1 or 2 and the at least one logic circuit may further increment a counter retained in a storage device communicably coupled to the at least one logic circuit responsive to a determination that a prior trusted contact between the first part and the second party has occurred.

Example 5 may include the elements of example 2 and the at least one logic circuit may further receive a second message that includes at least data logically associated with the second party communicated by the second portable device logic circuit; and store at least a portion of the second message in a storage device communicably coupled to the first portable device logic circuit.

Example 6 may include the elements of example 5 and the at least one logic circuit may further receive the second message that includes data logically associated with the second party, the second message including at least one of: data representative of public information logically associated with the second party or data representative of private information logically associated with the second party.

Example 7 may include the elements of any of examples 1 or 2 and the at least one logic circuit may further receive at least one signal from the at least one sensor, the at least one signal including at least one of data indicative of a physical action by at least one of either the first party or the second party, the physical action indicative of the trusted relationship between the first party and the second party; and data indicative of at least one of: a location of the first party; a proximity of the first party to at least the second party; or one or more biophysical aspects of the second party.

Example 8 may include the elements of example 1 and the at least one logic circuit may further autonomously determine whether the data included in the sensor signal is indicative of a trusted physical contact between the first party possessing the first portable device and the second party possessing the second portable electronic device.

According to example 9 there is provided a method of communicating information between devices responsive to autonomously detecting a trusted contact between the parties possessing the devices. The method may include receiving by a logic circuit in at least the first portable device a signal including data from a communicably coupled sensor. The method may further include autonomously determining by the logic circuit whether data included in the signal is indicative of a trusted contact between the first party and the second party. The method may further include autonomously initiating, by at least the first portable device logic circuit, a pairing with a logic circuit in the second portable device responsive to determining a trusted contact between the first party and the second party has occurred.

Example 10 may include elements of example 9 and the method may further include autonomously determining, by the first portable device logic circuit whether a prior trusted contact between the first party and the second party has occurred. The method may further include generating, by the first portable device logic circuit, a first message that includes at least data logically associated with the first party. The method may further include autonomously communicating the first message to the second portable device logic circuit via at least one wireless communication interface communicably coupled to the first portable device logic circuit.

Example 11 may include elements of example 10 where generating, by the first portable device logic circuit, a first message that includes at least data logically associated with the first party may further include generating the first message, the first message including at least one of: data representative of public information logically associated with the first party; or data representative of private information logically associated with the first party.

Example 12 may include elements of example 10 and the method may further include incrementing a counter retained in a storage device communicably coupled to the first portable device logic circuit responsive to a determination that a prior trusted contact between the first part and the second party has occurred.

Example 13 may include elements of any of examples 10 through 12 and the method may further include receiving, by the first portable device logic circuit, a second message communicated by the second portable device logic circuit, the second message including data logically associated with the second party; and storing, by the first portable device logic circuit, at least a portion of the second message in a storage device communicably coupled to the first portable device logic circuit.

Example 14 may include elements of example 13 where receiving a second message that includes at least data logically associated with the second party communicated by the second portable device logic circuit may further include receiving the second message by the first portable device logic circuit, the second message including at least one of: data representative of public information logically associated with the second party; or data representative of private information logically associated with the second party.

Example 15 may include elements of example 9 where receiving by at least the first portable device an input representative of a trusted contact between the first party and the second party may further include receiving, by the first portable device logic circuit, at least one signal provided by at least one sensor communicably coupled to the first portable device logic circuit, the at least one signal including information representative of the trusted contact between the first party and the second party.

Example 16 may include elements of example 15 where receiving at least one signal provided by at least one sensor communicably coupled to the first portable device logic circuit may further include receiving, by the first portable device logic circuit, at least one signal provided by at least one sensor communicably coupled to the first portable device logic circuit, the at least one signal including at least one of: data representative of a physical action by at least one of either the first party or the second party, the physical action indicative of the trusted relationship between the first party and the second party; and data representative of at least one of: a location of the first party; a proximity of the first party to at least the second party; and one or more biophysical aspects of the second party.

Example 17 may include the elements of example 9 where autonomously determining whether data included in the signal is indicative of a trusted contact between the first party and the second party may further include autonomously determining, by the logic circuit, whether data included in the signal is indicative of a trusted physical contact between the first party and the second party.

According to example 18 there is provided a storage device including machine-readable instructions, that when executed by at least one logic circuit, cause the at least one logic circuit to receive from at least one sensor at least one signal that includes data. The instructions may further cause the at least one logic circuit to autonomously determine whether the data included in the sensor signal is indicative of a trusted contact between a first party possessing the first portable device and a second party possessing a second portable device. The instructions may further cause the at least one logic circuit to autonomously initiate a wireless pairing with a logic circuit in the second portable device responsive to the determination that a trusted contact between the first party and the second party has occurred.

Example 19 may include elements of example 18 and the instructions may cause the at least one logic circuit to further autonomously determine whether a prior trusted contact between the first party and the second party has occurred. The instructions may cause the at least one logic circuit to further generate a first message that includes at least data representative of one or more attributes logically associated with the first party. The instructions may cause the at least one logic circuit to further communicate the first message to the second portable device logic circuit via at least one wireless communication interface communicably coupled to the first portable device logic circuit.

Example 20 may include elements of example 19 where the instructions that cause the at least one logic circuit to generate a first message that includes at least data representative of one or more attributes logically associated with the first party, may further cause the at least one logic circuit to generate the first message, the first message including at least one of: data representative of public information logically associated with the first party; or data representative of private information logically associated with the first party.

Example 21 may include elements of any of examples 19 or 20 and the instructions may further cause the at least one logic circuit to increment a counter retained in a storage device communicably coupled to the first portable device logic circuit responsive to a determination that a prior trusted contact between the first part and the second party has occurred.

Example 22 may include elements of any of examples 19 or 20 and the instructions may further cause the at least one logic circuit to receive at least one signal from the at least one sensor, the at least one signal including at least one of: data representative of a physical action by at least one of either the first party or the second party, the physical action indicative of the trusted relationship between the first party and the second party; or data representative of at least one of: a location of the first party; a proximity of the first party to at least the second party; and one or more biophysical aspects of the second party.

Example 23 may include elements of example 19 and the instructions may further cause the at least one logic circuit to autonomously determine whether the data included in the sensor signal is indicative of a trusted physical contact between the first party possessing the first portable device and the second party possessing a second portable device.

According to example 24 there is provided a data transfer system for communicating information between a first portable device possessed by a first party and a second portable device possessed by a second party. The system includes a means for receiving an input at the first portable device. The system further includes a means for autonomously determining whether a trusted contact between the first party and the second party has occurred. The system also includes a means for autonomously initiating a pairing between the first portable electronic device and the second portable device responsive to the receiving the input representative of a trusted contact between the first party and the second party.

Example 25 may include elements of example 24 and may additionally include a means for autonomously determining whether a prior trusted contact between the first party and the second party has occurred. The system may additionally include a means for generating a first message that includes at least data logically associated with the first party; and a means for autonomously communicating the first message to the second portable device logic circuit.

Example 26 may include elements of example 25 and the means for generating a first message that includes at least data logically associated with the first party may further include a means for generating the first message, the first message including at least one of: data representative of public information logically associated with the first party; or data representative of private information logically associated with the first party.

Example 27 may include elements of example 25 and may further include a means for incrementing a counter responsive to a determination that a prior trusted contact between the first part and the second party has occurred.

Example 28 may include elements of example 25 and may further include a means for receiving a second message communicated by the second portable device, the second message including data logically associated with the second party; and a means for storing at least a portion of the second message on a storage device communicably coupled to the first portable device logic circuit.

Example 29 may include elements of example 28 and the means for receiving a second message that includes at least data logically associated with the second party communicated by the second portable device logic circuit may further include a means for receiving the second message, the second message including at least one of data representative of public information logically associated with the second party or data representative of private information logically associated with the second party.

Example 30 may include elements of example 24 and the means for receiving an input representative of a trusted contact between the first party and the second party may further include a means for receiving at least one signal provided by at least one sensor communicably coupled to the first portable device logic circuit, the at least one signal including information representative of the trusted contact between the first party and the second party.

Example 31 may include elements of example 30 and the means for receiving at least one signal provided by at least one sensor communicably coupled to the first portable device logic circuit may further include a means for receiving at least one signal provided by at least one sensor communicably coupled to the first portable device logic circuit, the at least one signal including at least one of: data representative of a physical action by at least one of either the first party or the second party, the physical action indicative of the trusted relationship between the first party and the second party; or data representative of at least one of: a location of the first party; a proximity of the first party to at least the second party; and one or more biophysical aspects of the second party.

According to example 32 there is provided a system for communicating information between a first portable device possessed by a first party and a second portable device possessed by a second party, the system being arranged to perform the method of any of examples 8 through 15.

According to example 33 there is provided a chipset arranged to perform the method of any of the claims 8 through 15.

According to example 34 there is provided at least one machine readable medium comprising a plurality of instructions that, in response to be being executed on a computing device, cause the computing device to carry out the method according to any of the claims 9 through 17.

According to example 35 there is provided a first portable device possessed by a first party configured for communicating information to a second portable device possessed by a second party, the first portable device being arranged to perform the method of any of the claims 9 through 17.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system comprising a first portable device, the first portable device comprising:
   at least one sensor;
   at least one wireless communications interface;
   a first logic circuit communicably coupled to the at least one sensor and to the at least one wireless communication interface, wherein the first logic circuit is configured to:
   receive from the at least one sensor at least one signal that includes data;
   autonomously determine whether the data included in the sensor signal is indicative of at least one of a body position or a hand gesture that is indicative of an existence of a trusted relationship between a first person possessing the first portable device and a second person possessing a second portable device; and autonomously initiate, when said data is indicative of an existence of a trusted relationship between the first person and the second person, a wireless pairing with the second portable device;

wherein:

the first portable device further comprises a plurality of counters, wherein each of said plurality of counters is logically associated with one or a plurality of contacts with whom the first person has had a trusted contact;

said first logic circuit is further configured, when said data is indicative of an existence of a trusted relationship between the first person and the second person, to increment a counter value of one counter of said plurality of counters, said one counter being logically associated with said second person; and said counter value is indicative of a strength of said trusted relationship between said first person and said second person.

2. The system of claim 1, wherein the hand gesture is a handshake and first logic circuit is further configured to:

determine whether the data included in the sensor signal is indicative of execution of said handshake by the first person and the second person; and when the data included in the sensor signal is indicative of performance of said handshake, the first logic circuit is to autonomously determine that a trusted relationship between the first person and the second person exists.

3. The system of claim 1, wherein the first logic circuit is further configured, following pairing of the first device and second device, to:

generate a first message that includes data logically associated with the first person and at least one of:

data representative of public information logically associated with the first person; or data representative of private information logically associated with the first person; and communicate, via the at least one wireless communications interface, the first message to the second portable device.

4. The system of claim 1, wherein the first logic circuit is further configured to:

receive a second message from the second portable device, the second message comprising at least data logically associated with the second person; and store at least a portion of the second message in a storage device communicably coupled to the first logic circuit.

5. The system of claim 4, wherein the second message further comprises at least one of: data representative of public information logically associated with the second person; or data representative of private information logically associated with the second person.

6. The system of claim 1, wherein the body position is a relative body position of a body of the first person and a body of the second person, and the first logic circuit is further configured to:

determine whether the relative body position is indicative that a trusted relationship between the first person and the second person exists; and the first logic circuit is to autonomously initiate said wireless pairing when the relative body position is indicative that said trusted relationship exists.

7. The system of claim 6, wherein determining whether the relative body position is indicative that a trusted relationship between the first person and the second person exists comprises determining whether the relative body position is indicative of an execution of at least one of a kiss or a hug by the first person and the second person.

8. A method of communicating information between a first portable device possessed by a first person and a second portable device possessed by a second person, the method comprising:

receiving, with a first logic circuit of the first portable device, a sensor signal including data from at least one sensor communicably coupled to the first portable device;

autonomously determining, by the first logic circuit, whether the data included in the sensor signal is indicative of at least one of a body position or hand gesture that is indicative of a trusted relationship between the first person and the second person; and autonomously initiating, by at least the first portable device, a wireless pairing with the second portable device, when said data is indicative of an existence of said trusted relationship between said first person and said second person.

wherein:

the first portable device further comprises a plurality of counters, wherein each of said plurality of counters is logically associated with one or a plurality of contacts with whom the first person has had a trusted contact and the method further includes incrementing, when said data is indicative of an existence of a trusted relationship between the first person and the second person, a counter value of one counter of said plurality of counters, said one counter being logically associated with said second person; and said counter value is indicative of a strength of said trusted relationship between said first person and said second person.

9. The method of claim 8, wherein:

the hand gesture is a handshake; and said autonomously determining whether the data included in the sensor signal is indicative of a trusted relationship comprises autonomously determining whether the data included in the sensor signal is indicative of a performance of said handshake by the first person and the second person; and said autonomous initiation of said wireless pairing is performed in response to a determination that the data included in the sensor signal is indicative of performance of said handshake.

10. The method of claim 8, wherein following wireless pairing of the first portable device and the second portable device, the method further comprises:

generating, by the first logic circuit, a first message that comprises at least one of data representative of public information logically associated with the first person; or data representative of private information logically associated with the first person.

11. The method of claim 10, further comprising:

receiving, by the first portable device, a second message from the second portable device, wherein the second message includes data logically associated with the second person; and storing, with the first portable device at least a portion of the second message in a storage device communicably coupled to the first logic circuit.

12. The method of claim 11, wherein the second message comprises:

data representative of public information logically associated with the second person; or data representative of private information logically associated with the second person.

13. The method of claim 8, wherein:

the body position is a relative body position of a body of the first person and a body of the second person;

autonomously determining whether the data included in the sensor signal is indicative of a trusted relationship comprises autonomously determining whether the relative body position is indicative that a trusted relationship between the first person and the second person exists; and said autonomous initiation of said wireless pairing is performed when the relative body position is indicative that said trusted relationship exists.

14. The method of claim 13, wherein said autonomously determining whether the relative body position is indicative that a trusted relationship between the first person and the second person exists comprises determining whether the relative body position is indicative of an execution of at least one of a kiss or a hug by the first person and the second person.

15. A storage device including machine-readable instructions, that when executed by first logic circuit of a first portable device, causes the first logic circuit to:

receive at least one sensor signal that includes data from at least one sensor communicably coupled to the first portable device;

autonomously determine whether the data included in the sensor signal is indicative of at least one of a body position or hand gesture that is indicative of a trusted relationship between a first person possessing the first portable device and a second person possessing a second portable device; and autonomously initiate a wireless pairing with the second portable device, when said data is indicative of an existence of said trusted relationship between said first person and said second person;

wherein:

the first portable device further comprises a plurality of counters, wherein each counter is logically associated with one or a plurality of contacts with whom the first person has had a trusted contact;

said instructions when executed further cause said first logic circuit to increment, when said data is indicative of an existence of a trusted relationship between the first person and the second person, a counter value of one counter of said plurality of counters, said one counter being logically associated with said second person; and said counter value is indicative of a strength of said trusted relationship between said first person and said second person.

16. The storage device of claim 15, wherein:

said hand gesture is a handshake;

autonomously determining of whether the data included in the sensor signal is indicative of a trusted relationship comprises autonomously determining whether the data included in the sensor signal is indicative of a performance of said handshake by the first person and the second person; and said autonomous initiation of said wireless pairing is performed in response to a determination that the data included in the sensor signal is indicative of performance of said handshake.

17. The storage device of claim 16, wherein:

the body position is a relative body position of a body of the first person and a body of the second person;

autonomously determining whether the data included in the sensor signal is indicative of a trusted relationship comprises autonomously determining whether the relative body position is indicative that a trusted relationship between the first person and the second person exists; and said autonomous initiation of said wireless pairing is performed when the relative body position is indicative that said trusted relationship exists.

18. The storage device of claim 17, wherein said autonomously determining whether the relative body position is indicative that a trusted relationship between the first person and the second person exists comprises determining whether the relative body position is indicative of an execution of at least one of a kiss or a hug by the first person and the second person.

19. The storage device of claim 15 wherein the machine-readable instructions when executed further cause the first logic circuit to perform the following operations comprising:

generating a first message that comprises at least one of:

data representative of public information logically associated with the first person; or data representative of private information logically associated with the first person.

\* \* \* \* \*